United States Patent
Huang et al.

(10) Patent No.: US 7,023,718 B2
(45) Date of Patent: Apr. 4, 2006

(54) TWO-PHASE DRIVER AND DRIVING METHOD

(75) Inventors: Nan-Chuan Huang, Taoyuan (TW); Chean-Lung Tsay, Hsinchu (TW)

(73) Assignee: Richtek Technology Corp., Hsinchu (TW)

( * ) Notice: Subject to any disclaimer, the term of this patent is extended or adjusted under 35 U.S.C. 154(b) by 118 days.

(21) Appl. No.: 10/704,621

(22) Filed: Nov. 12, 2003

(65) Prior Publication Data

US 2004/0095791 A1   May 20, 2004

(30) Foreign Application Priority Data

Nov. 14, 2002   (TW) ............................... 91133430 A

(51) Int. Cl.
*H02M 7/5387* (2006.01)
(52) U.S. Cl. ...................................................... 363/132
(58) Field of Classification Search .................. 363/17, 363/56.02, 132, 136
See application file for complete search history.

(56) References Cited

U.S. PATENT DOCUMENTS

| | | | | |
|---|---|---|---|---|
| 5,691,607 A | * | 11/1997 | Zawislak et al. | ............ 315/308 |
| 5,875,103 A | * | 2/1999 | Bhagwat et al. | ............... 363/17 |
| 6,567,278 B1 | * | 5/2003 | Rufer et al. | ................... 363/17 |
| 6,611,444 B1 | * | 8/2003 | Ayyanar et al. | ............. 363/132 |
| 2004/0136215 A1 | * | 7/2004 | Tsay et al. | ................... 363/131 |

* cited by examiner

*Primary Examiner*—Adolf Berhane
(74) *Attorney, Agent, or Firm*—Rosenberg, Klein & Lee

(57) ABSTRACT

A two-phase driver comprises two H-bridge circuits each of them including a transformer and two switch assemblies connected to the opposite terminals of the primary side of the transformer, in which one of the switch assemblies is shared by the two H-bridge circuits. Each of the switch assemblies includes a high-side switch and a low-side switch, and each of the high-side switch and low-side switch is switched by a respective signal so as to modulate the loading currents supplied to two loading loops connected to the two H-bridge circuits, respectively.

22 Claims, 4 Drawing Sheets

TWO-PHASE DRIVER AND DRIVING METHOD

FIELD OF THE INVENTION

The present invention relates generally to a driver configured with H-bridge circuit, and more particularly, to a two-phase driving circuit and method for cold cathode fluorescent lamps (CCFLs).

BACKGROUND OF THE INVENTION

CCFL has been applied for the backlight sources of displays, especially for liquid crystal displays (LCDs), which requires a circuit to drive them. Due to the small size of conventional displays, so far one CCFL is enough for one display. However, recent displays tend to be enlarged in their scales, resulting in that two or more CCFLs are required for one backlight source, and there is thus a need of a driving circuit capable of driving two or more CCFLs for the backlight source.

A prior art driver to drive two CCFLs is proposed by U.S. Pat. No. 5,892,336 issued to Lin et al., which comprises a transformer having its primary side connected with an AC power supply and secondary side connected with two CCFLs. Since these two CCFLs are connected in series to the driver, the currents flowing through them are identical and therefore limit the CCFLs to be adjusted individually. However, there are always more or less variations between CCFLs once they are manufactured, and thus they have diversified luminescent features. As a result, this driver with CCFLs connected in series and thereby having the same driving current for all of the CCFLs cannot be available for applications that adjustable brightness of individual lamp is required.

An alternative driver proposed by U.S. Pat. No. 6,396,722 issued to Lin employs four MOS transistors and one transformer to form a full bridge circuit to drive a CCFL, yet this driver drives only one CCFL. Two independent full bridge circuits are required to drive two CCFLs individually, if this art is utilized. Even the driving currents are adjustable for respective CCFLs for their brightness to be uniformed when two independent full bridge circuits are provided, the cost and volumn of the driver are dramatically increased.

Therefore, it is desired a low-cost and small-size driver to adjust the driving current for individual CCFL in a multiple CCFL system to control their respective brightness.

SUMMARY OF THE INVENTION

An object of the present invention is to disclose a two-phase driver configured with H-bridge circuit and its driving method.

Another object of the present invention is to propose a two-phase driver configured with H-bridge circuit and the driving method thereof for modulating two loading currents for two loading loops.

Yet another object of the present invention is to provide a two-phase driver configured with H-bridge circuit and the driving method thereof for balancing two loading currents of two balance or imbalance loads.

In a two-phase driver, according to the present invention, two H-bridge circuits are comprised and each of them including a transformer connected with two switch assemblies at the opposite terminals of its primary side and a CCFL at its secondary side, of which one of the switch assemblies is shared by the two H-bridge circuits and each of the switch assemblies includes a high-side switch and a low-side switch controlled by a respective signal so as to modulate the loading currents flowing through the two CCFLs, and therefore to balance the loading currents or to uniform the brightness of the two CCFLs. Furthermore, only six switches are employed in the two-phase driver, and thus the cost and volunme is reduced due to the less switch componants.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
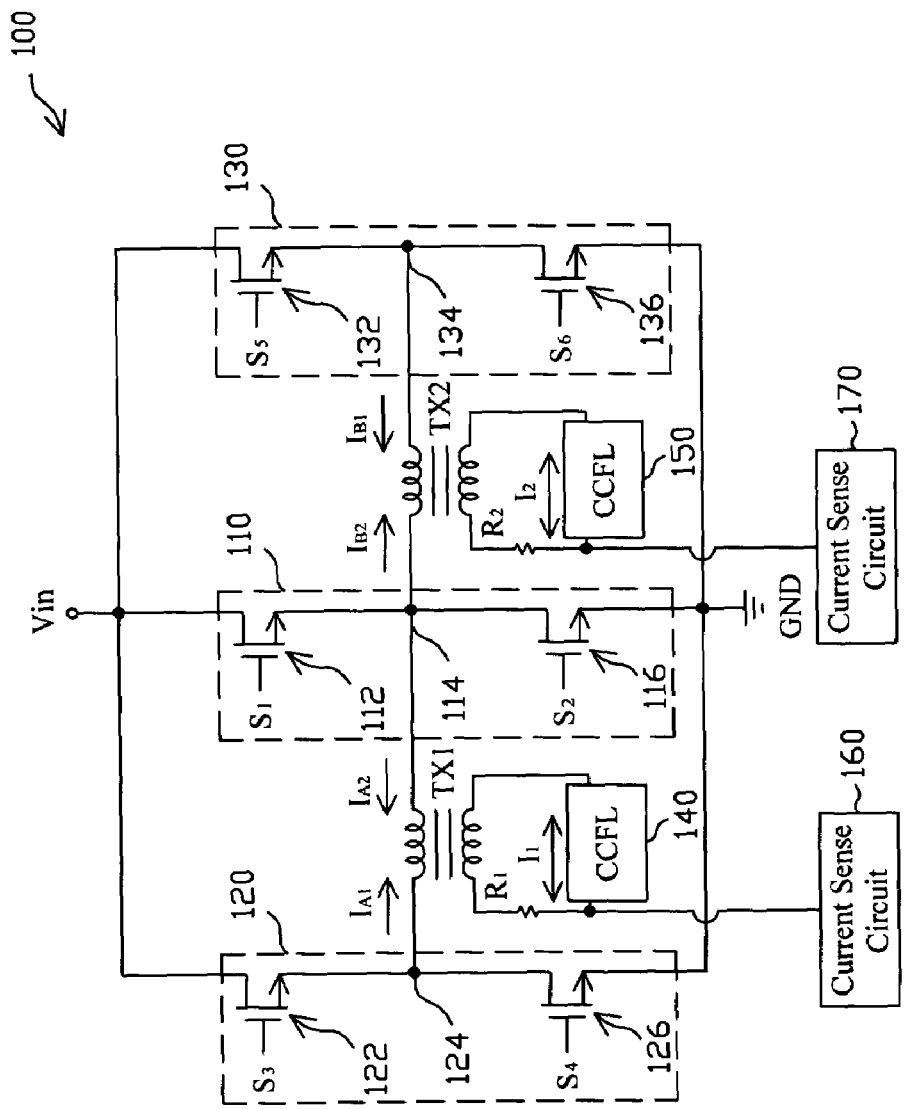
FIG. 1 shows an embodiment of two-phase driver configured with H-bridge circuit according to the present invention.

FIG. 1 shows an embodiment two-phase driver 100 that comprises a first switch assembly 110 composed of a high-side NMOS transistor 112 between input voltage $V_{in}$ and node 114 and a low-side NMOS transistor 116 between the node 114 and ground GND, a second switch assembly 120 composed of a high-side NMOS transistor 122 between the input voltage $V_{in}$ and node 124 and a low-side NMOS transistor 126 between the node 124 and ground GND, and a third switch assembly 130 composed of a high-side NMOS transistor 132 between the input voltage $V_{in}$ and node 134 and a low-side NMOS transistor 136 between the node 134 and ground GND. The primary side of a transformer $TX_1$ is connected between the switch assemblies 110 and 120 by the nodes 114 and 124 to thereby form an H-bridge circuit in combination with the switch assemblies 110 and 120, and the secondary side of the transformer $TX_1$ is connected to first loading loop, i.e., a CCFL 140. Likewise, a transformer $TX_2$ has its primary side connected between the switch assemblies 110 and 130 by the nodes 114 and 134 to thereby form another H-bridge circuit in combination with the switch assemblies 110 and 130, and has its secondary side connected to second loading loop, i.e., another CCFL 150. In this arrangement, the switch assembly 110 is shared by the two H-bridge circuits, and thus two or more switch componants are saved. Moreover, two current sense circuits 160 and 170 are inserted to the first and second loading loops so as to sense the loading currents $I_1$ and $I_2$ of the CCFLs 140 and 150 thereof, respectively.

The NMOS transistors 112–136 are all serving as switches manipulated by six control signals $S_1$–$S_6$, respectively, as shown in FIG. 1. When the NMOS transistors 116, 122 and 132 are turned on at the same time by their respective control signals $S_2$, $S_3$ and $S_5$, currents $I_{A1}$ and $I_{B1}$ are generated to flow through the primary sides of the transformers $TX_1$ and $TX_2$, respectively, and when the NMOS transistors 112, 126 and 136 are turned on at the same time by their respective control signals $S_1$, $S_4$ and $S_6$, currents $I_{A2}$ and $I_{B2}$ are generated to flow through the respective primary sides of the transformer $TX_1$ and $TX_2$ in opposite directions. As a result, the supplied power is transformed by the transformers $TX_1$ and $TX_2$ so as to generate the loading currents $I_1$ and $I_2$ for the CCFLs 140 and 150, respectively. In this embodiment, the modulations of the loading currents $I_1$ and $I_2$ and thereby the brightness of the CCFLs 140 and 150 are achieved by the timings of the signals $S_3$, $S_4$, $S_5$ and $S_6$ to the other two $S_1$ and $S_2$.

Figure 2:
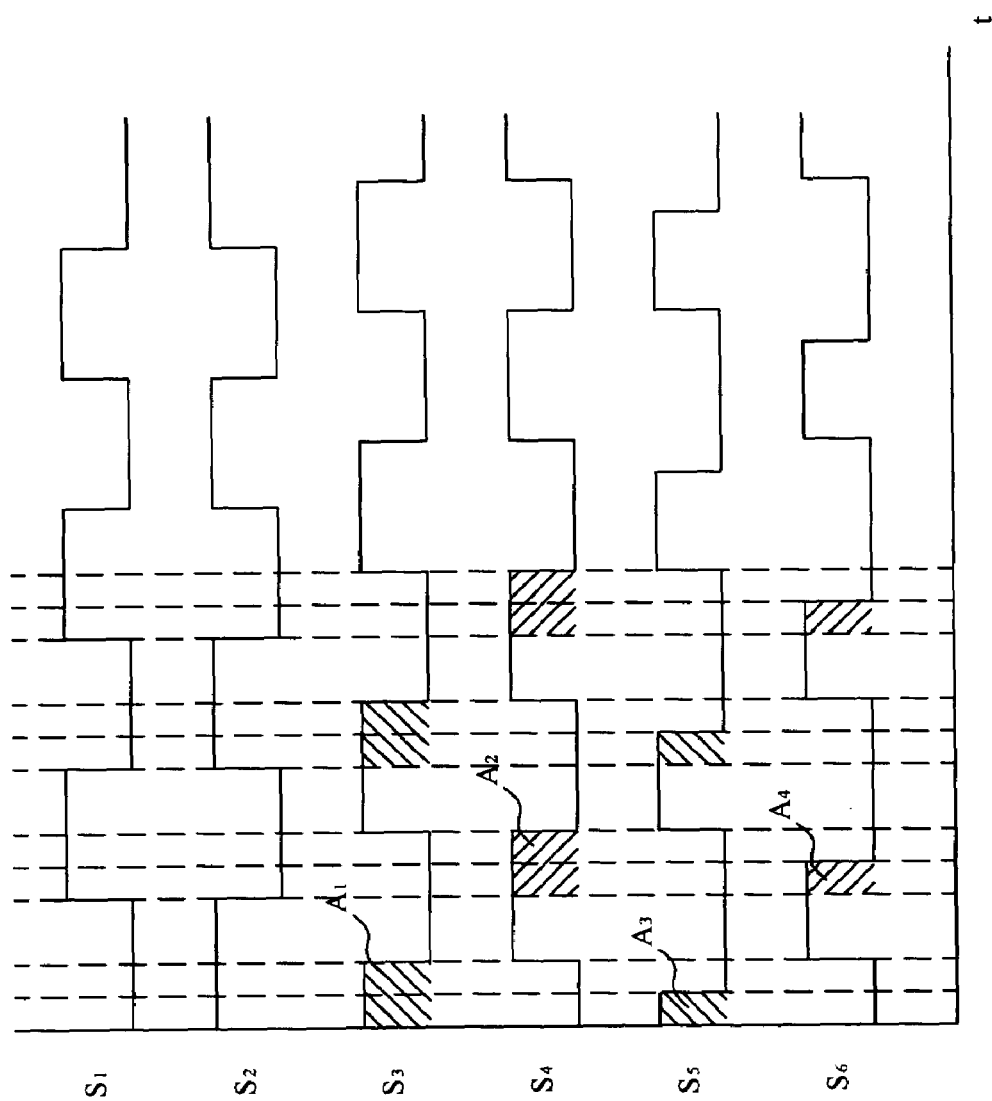
FIG. 2 illustrates the timing diagram of the two-phase driver shown in FIG. 1 under imbalanced loading currents.

FIG. 2 shows the timing diagram of the control signals $S_1$–$S_6$ in the two-phase driver 100 of FIG. 1, in which the shaded area $A_1$ indicates the period when the signals $S_2$ and $S_3$ both are turned on, the shaded area $A_2$ indicates the period when the signals $S_1$ and $S_4$ both are turned on, the shaded area $A_3$ indicates the period when the signals $S_2$ and $S_5$ both are turned on, and the shaded area $A_4$ indicates the period when the signals $S_1$ and $S_6$ both are turned on. The areas of the shaded areas $A_1$ and $A_2$ indicate the magnitude of the currents $I_{A1}$ and $I_{A2}$ flowing through the primary side of the transformer $TX_1$ and corresponding to the loading current $I_1$ transformed on the secondary side of the transformer $TX_1$, and the areas of the shaded areas $A_3$ and $A_4$ indicate the magnitude of the current $I_{B1}$ and $I_{B2}$ flowing through the primary side of the transformer $TX_2$ and corresponding to the loading current 12 transformed on the secondary side of the transformer $TX_2$. As shown in FIG. 2, the areas of $A_1$–$A_4$ are not all identical, and therefore, the magnitudes of the currents $I_{A1}$, $I_{A2}$, $I_{B1}$ and $I_{B2}$ flowing through the transformers $TX_1$ and $TX_2$ are different. To modulating the loading currents $I_1$ and $I_2$, the timings of the control signals $S_1$–$S_6$ are properly selected to adjust the currents $I_{A1}$, $I_{A2}$, $I_{B1}$ and $I_{B2}$ of the transformers $TX_1$ and $TX_2$. Since the brightness of a CCFL is proportional to the current flowing therethrough and the transformed currents $I_1$ and $I_2$ are determined by the overlapped areas $A_1$–$A_4$ between the control signals $S_1$–$S_6$, the brightness of the loading CCFL 140 or 150 shown in FIG. 1 is increased or decreased by adjusting the duty cycles of the signals $S_3$ and $S_4$ or $S_5$ and $S_6$ such that the overlapped areas $A_1$–$A_4$ are properly controlled corresponding to the selected signals $S_1$ and $S_2$. This manner the two loading CCFLs 140 and 150 are individually and well controlled to have an uniformed brightness, even they are different in their luminant features.

Figure 3:
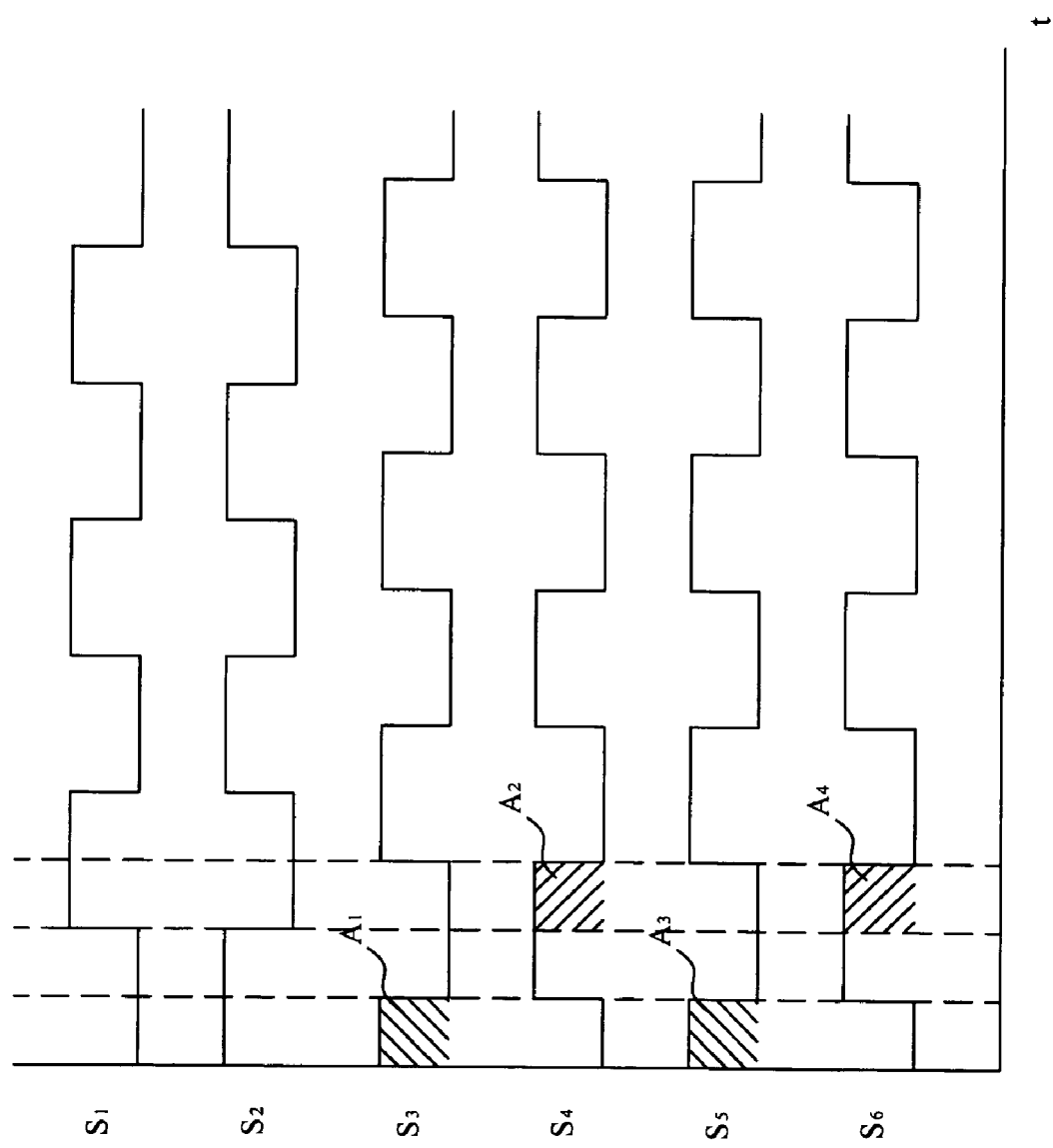
FIG. 3 illustrates the timing diagram of the two-phase driver shown in FIG. 1 under balanced loading currents.

In the same way, referring to FIG. 3, the overlapped areas $A_1$ and $A_2$ determined by the signals $S_3$ and $S_4$ and $A_3$ and $A_4$ determined by the signals $S_5$ and $S_6$ for a pair of selected signals $S_1$ and $S_2$ can be adjusted for the two CCFLs 140 and 150 to have a same magnitude for the loading currents $I_1$ and $I_2$ therethrough. In other words, either the brightness or the loading currents can be uniformed or balanced for the two CCFLs 140 and 150 by the same driver 100 under the control signals $S_1$–$S_6$, no matter these two loading loops 140 and 150 are originally balanced or imbalanced. Furthermore, due to the driver 100 having superior controllability of the loading currents $I_1$ and $I_2$, the two loading loops 140 and 150 are flexible for loading variations.

Figure 4:
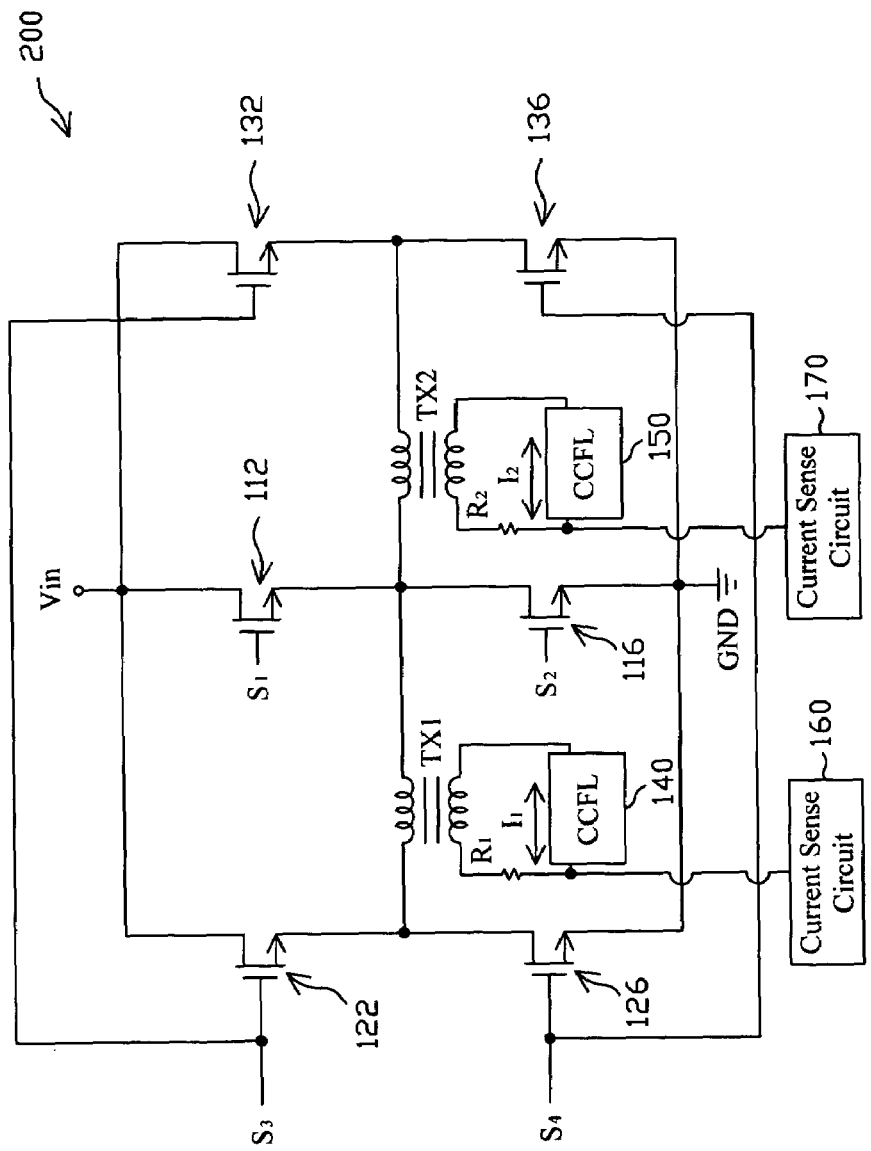
FIG. 4 shows another embodiment of the present invention under balanced loading currents.

FIG. 4 is another embodiment of the control signals $S_1$–$S_6$ upon balanced loading currents. As in the first embodiment, a driver 200 shown in FIG. 4 comprises six NMOS transistors 112–136 configured in two H-bridge circuits with a shared or common switch assembly composed of switches 112 and 116, two transformers $TX_1$ and $TX_2$ connected in the two H-bridge circuits, respectively, to transform the supplied power to the two loading CCFLs 140 and 150, as well as two current sense circuits 160 and 170 for the two loading loops, respectively. However, the two transistors 122 and 132 respectively in the two H-bridge circuits are common gated to be controlled by the same signal $S_3$, and another transistors 126 and 136 are also common gated to be controlled by the same signal $S_4$. By this arrangement, the laoding currents $I_1$ and $I_2$ for the CCFLs 140 and 150 are identical or balanced. Due to the six control signals being reduced to four control signals $S_1$–$S_4$, this embodiment further simplifies the control signal generator for the signals $S_1$–$S_4$. As such, the cost and volumn of the overall circuit are further reduced.

By the proposed driver herewith configured in two H-bridge circuits sharing a common switch assembly, two loading loops can be individually modulated for their loading currents and as a result, the brightness of two CCFLs. With a same driver, either loading currents or brightness of two CCFLs in two loading loops can be balanced, depending on the control signals for the two H-bridge circuits. Moreover, the cost and volumn of the driver are reduced by less switch componants, and the cost and volumn of the whole circuit are further reduced by less control signals.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A two-phase driver comprising:
   a first loading loop and a second loading loop, said first and second loading loops being individually operable one apart from the other;
   a first transformer having a primary side and a secondary side connected to said first loading loop;
   a second transformer having a primary side and a secondary side connected to said second load loop;
   a first switch assembly connected between an input voltage and a reference and including a first high-side switch connected between said input voltage and a first node connected to respective first terminals of said primary sides of said first and second transformers and a first low-side switch connected between said first node and reference;
   a second switch assembly connected between said input voltage and reference for forming a first H-bridge circuit in combination with said first switch assembly to thereby modulate a first current flowing through said primary side of said first transformer, said second switch assembly including a second high-side switch connected between said input voltage and a second node connected to a second terminal of said primary side of said first transformer and a second low-side switch connected between said second node and reference; and
   a third switch assembly connected between said input voltage and reference for forming a second H-bridge circuit in combination with said first switch assembly to thereby modulate a second current flowing through said primary side of said second transformer, said third switch assembly including a third high-side switch connected between said input voltage and a third node connected to a second terminal of said primary side of said second transformer and a third low-side switch connected between said third node and reference;
   wherein said high-side switches and low-side switches are switched by first to sixth signals, respectively.

2. The two-phase driver of claim 1, wherein said third and fifth signals are substantially same as each other and said fourth and sixth signals are substantially same as each other.

3. The two-phase driver of claim 1, wherein said first transformer transforms said input voltage to a first alternating voltage to said first loading loop and said second transformer transforms said input voltage to a second alternating voltage to said second loading loop.

4. The two-phase driver of claim 1, wherein said third and fifth signals are significantly different from each other and said fourth and sixth signals are significantly different from each other.

5. The two-phase driver of claim 1, wherein said input voltage is a direct voltage.

6. The two-phase driver of claim 1, wherein said high-side switches and low-side switches each comprises an NMOS transistor.

7. The two-phase driver of claim 1, further comprising a first current sense circuit for sensing the current flowing through said first loading loop and a second current sense circuit for sensing the current flowing through said second loading loop.

8. The two-phase driver of claim 1, wherein said first and second loading loops each includes at least a CCFL.

9. A two-phase driver comprising:
a first switch assembly, a second switch assembly, and a third switch assembly each connected between an input voltage and a reference;
a first transformer connected between said first and second switch assembly for forming a first H-bridge circuit to thereby modulate a first current supplied for a first loading loop; and
a second transformer connected between said first and third switch assembly for forming a second H-bridge circuit to thereby modulate a second current supplied for a second loading loop;
said first and second loading loops being individually operable one apart from the other.

10. The two-phase driver of claim 9, wherein said first and second currents have a substantially same magnitude as each other.

11. The two-phase driver of claim 9, wherein said first and second currents have a significant different magnitude from each other.

12. The two-phase driver of claim 9, wherein said input voltage is a direct voltage.

13. The two-phase driver of claim 12, wherein said first and second currents each is an alternating current.

14. The two-phase driver of claim 9, further comprising a first current sense circuit and a second current sense circuit for sensing said first and second currents, respectively.

15. The two-phase driver of claim 9, wherein said first and second loading loops each comprises at least a CCFL.

16. A two-phase driving method comprising the steps of:
connecting a first switch assembly, a second switch assembly, and a third switch assembly each between an input voltage and a reference;
connecting a first transformer between said first and second switch assemblies for forming a first H-bridge circuit to thereby modulate a first current supplied for a first loading loop; and
connecting a second transformer between said first and third switch assemblies for forming a second H-bridge circuit to thereby modulate a second current supplied for a second loading loop;
said first and second loading loops being individually operable one apart from the other.

17. The two-phase driving method of claim 16, further comprising manipulating said first, second and third switch assemblies for said first and second currents to have a substantially same magnitude as each other.

18. The two-phase driving method of claim 16, further comprising manipulating said first, second and third switch assemblies for said first and second currents to have a significant different magnitude from each other.

19. The two-phase driving method of claim 16, further comprising transforming said input voltage to a first alternating voltage and a second alternating voltage to said first and second loading loops, respectively.

20. A two-phase driving method comprising the steps of:
modulating a first current for a first loading loop by a first H-bridge circuit including two switch assemblies; and
modulating a second current for a second loading loop by a second H-bridge circuit including two switch assemblies;
wherein one of said switch assemblies is shared by said first and second H-bridge circuits, and said first and second loading loops are individually operable one apart from the other.

21. The two-phase driving method of claim 20, further comprising manipulating said switch assemblies for said first and second currents to have a substantially same magnitude as each other.

22. The two-phase driving method of claim 20, further comprising manipulating said switch assemblies for said first and second currents to have a significant different magnitude from each other.

* * * * *